Oct. 20, 1959   R. E. WHEELER   2,909,263
CARRIAGE RETURN DASH POT FOR TYPEWRITERS AND THE LIKE
Filed Sept. 25, 1958
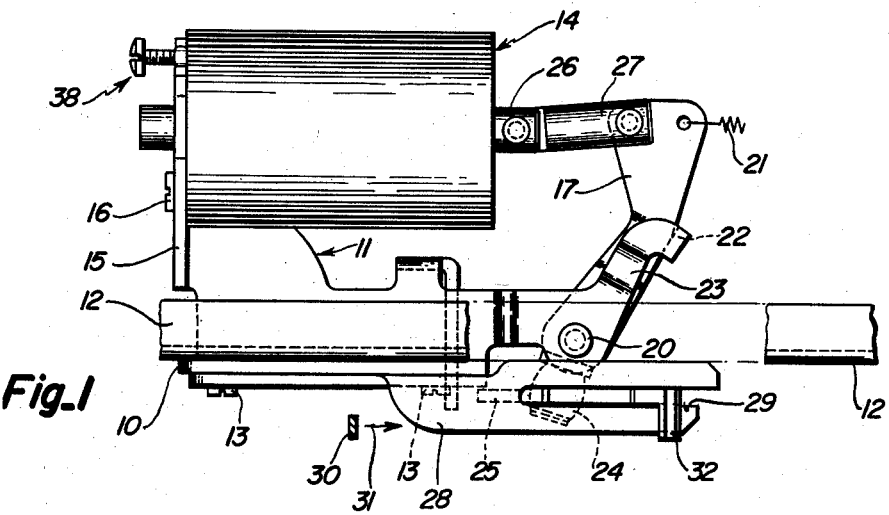
Fig. 1
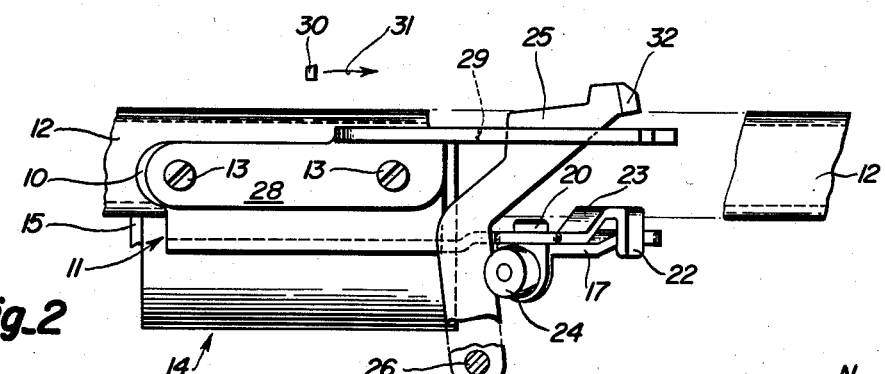
Fig. 2
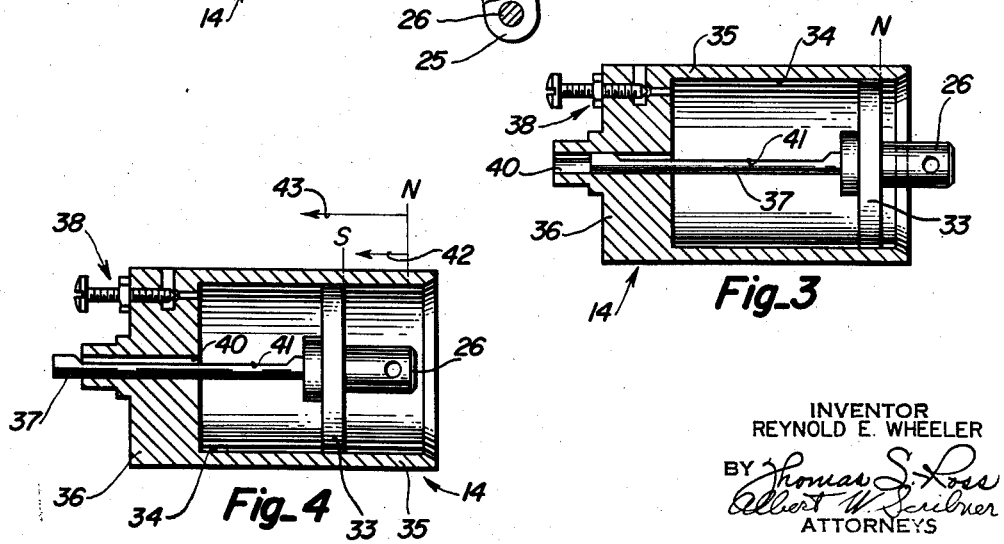
Fig. 3
Fig. 4
INVENTOR
REYNOLD E. WHEELER
BY
ATTORNEYS

United States Patent Office 2,909,263
Patented Oct. 20, 1959

2,909,263

CARRIAGE RETURN DASH POT FOR TYPEWRITERS AND THE LIKE

Reynold E. Wheeler, Farmington, Conn., assignor to Royal McBee Corporation, Westchester, N.Y., a corporation of New York Application September 25, 1958, Serial No. 763,249

2 Claims. (Cl. 197—183)

The invention relates to a novel type dash pot having particular application to business machines, and more specifically relates to an improved construction for a vented dash pot which is capable of efficiently arresting the return motion of a typewriter carriage.

In most conventional typewriters the carriage return motion is damped and terminated by the actuation of some sort of dash pot arrangement. The amount of kinetic energy which must be absorbed by such dash pots varies depending, inter alia, on the distance through which the carriage has moved. One difficulty experienced here is that when the dash pot is adjusted so as to properly accommodate a long carriage return, i.e. to absorb a relatively large amount of kinetic energy, such adjusted dash pot offers too light or weak a braking action for a short carriage return. Conversely when the dash pot is adjusted to properly accommodate a short return of the carriage, i.e. to absorb a relatively small amount of kinetic energy, then such an adjusted dash pot offers too great or sudden a braking action for a long carriage return.

The primary object of the instant invention is to provide a novel type dash pot for typewriters or the like whereby the proper dampening or braking action is efficiently applied to the carriage at the end of both long and short carriage returns.

Another object of the invention is to provide a novel carriage arresting dash pot which has at least two individually and sequentially operable exhaust valves which will respectively accommodate long and short carriage returns.

Another object of the invention is to provide an improved carriage return arresting means which will partake of a disproportionately longer working stroke during the arresting of a relatively fast carriage return movement as compared to that for a relative slow carriage return movement.

Other objects and attendant advantages of the invention will become apparent as the disclosure progresses.

In the drawings:

Fig. 1 is a plan view showing the instant dash pot and its related actuating linkage.

Fig. 2 is a front view of the apparatus shown in Fig. 1.

Figs. 3 and 4 are diametral sectional views respectively showing the normal and actuated positions for the dash pot piston.

Referring to Figures 1 and 2 the bent off portion 10 of a bracket 11 is secured to the typewriter frame 12 by means of screws 13 while a dash pot 14 is secured to another bent off portion 15 of said bracket 11 by means of screws 16. The right hand end of said bracket pivotally supports an actuating arm 17 by means of a stud 20, said arm being yieldably biased in a clockwise direction, by any suitable means such as a spring 21, into normal engagement with a bent off ear 22 of the bracket projection 23. The lower or inner end of arm 17 is provided with a suitable roller 24 which lies in the arcuate path of travel of a lever 25 which is pivotally mounted on the machine frame by any suitable means such as illustrated at 26, Fig. 2. The upper or outer end of arm 17 is articulately connected to the piston stem 26 of dash pot 14 by means of a link 27. An additional bracket 28, secured to the machine frame 12 by means of the screws 13, is provided at its outer end with a slot 29 which serves to laterally guide the upper portion of said lever 25. The means for operatively displacing the lever 25 comprises the usual left hand margin stop 30 which during a return movement of the typewriter carriage moves to the right, as illustrated by arrow 31, and which during the terminal portion of said carriage return movement is adapted to engage a bent over ear 32 formed at the upper end of said lever 25. When the margin stop 30 engages ear 32 and displaces lever 25 in a clockwise direction, Fig. 2, roller 24 will be moved to the right and arm 17 will be driven in a counterclockwise direction, Fig. 1, thereby effecting an operative stroke of the dash pot through said link 27. After the dash pot 14 has arrested the return motion of the typewriter carriage the return drive mechanism is disengaged and the carriage is again engaged for operation under the control of the letter spacing mechanism. This action is conventional in nature and need not be further discussed here. At this time spring 21 restores the dash pot to its normal position preparatory for arresting the next return movement of the carriage.

The detailed construction of the instant dash pot is shown in Figs. 3 and 4. Stem 26 is connected to a piston 33 which is slidably mounted in the cylindrical recess 34 defined by the walls of the cylinder body 35 of dash pot 14. In the end wall 36 of cylinder body 35 there is provided the usual adjustable screw type needle valve arrangement 38 whereby the amount of liquid or gas fluid flowing into or out the dash pot in response to a given motion of piston 33 may normally be regulated. In the instant device an additional valve is provided in order to control a further amount of fluid which is allowed to enter or exhaust from the dash pot. Here an axially disposed valve control rod 37 is secured to the inner side of piston 33 and extends through an aperture 40 formed in the end wall 36 of the dash pot cylinder body 35. This valve control rod is formed with a longitudinally disposed groove 41 so that aperture 40 may be respectively pneumatically closed and opened during the various portions of the movement of the piston 33 and the attached valve control rod 37. In the normal position N, Figs. 3 and 4, of piston 33 the aperture 40 is closed by the ungrooved outer end of the valve control rod as shown in Fig. 3. This condition will obtain for any leftward piston displacement 42 up to a position S, Fig. 4. When piston 33 is displaced beyond position S the aperture 40 will be partially opened by the groove 41 in the control rod 37 and will thereby permit an additional predetermined amount of the compressed air to escape from the dash pot through said partially opened aperture 40.

During relatively short carriage return strokes, i.e. up to about ten letter spaces, the stroke 42 of piston 33 will extend between positions N and S, hence the only fluid exhaust or escape route from the dash pot is through the said conventional type needle valve arrangement 38. Here the needle valve arrangment 38 is adjusted so as to permit only a small amount of air to escape whereby the pressure in the dash pot will build up and resist said piston movement so as to properly slow down and "cushion" the relatively slow speed return movement of the carriage. During this action said air pressure will increase very rapidly to appropriately arrest said carriage, but if a continued proportionate increase in air pressure were permitted for a relatively long stroke 43 of the piston 33 the resistance of the air compressed in the dash pot would quickly become too high. Under these conditions the arresting of the fast moving carriage would give rise to a jarring impact rather than to the desired rapid but "cushioned" deceleration. In the instant arrangement the provision of groove 41 permits an additional amount of compressed air to progressively escape from the dash pot when the piston 33 is displaced beyond said position S so that the resistance thereafter afforded by the compressed air in the dash pot remains approximately constant. In this way a substantial braking action is applied to the typewriter carriage over a longer period of time and through a longer stroke of said piston thereby smoothly dissipating the relatively high energy potential of the fast moving carriage.

By using the needle valve arrangement 38 to control the arresting of a short carriage return and using both valve arrangements 38 and 40, 41 to control the arresting of a long carriage return, individually operable means are thus here available for respectively controlling the amount of air exhausted and the amount of braking applied during each of said carriage return motions. As a result each of these two braking actions may be individually tailored to produce the desired characteristics of deceleration of the carriage.

If desired the axial profile of groove 41 may be tapered or may be provided with a sinusoidal type shape. A plurality of axial spaced grooves may be used instead of the single groove 41 shown in the drawings; such variations in profile shape being specifically determined in accordance with the desired degree, rapidity and/or other dynamic characteristic desired for the deceleration of the typewriter carriage. Further, the valve control rod 37 may be made axially adjustable with respect to the piston 33.

While there is in this application specifically described one form which the invention may assume in practice, it will be understood that this form of the same is shown for purposes of illustration only and that the invention may be modified and embodied in various other forms without departing from its spirit or the scope of the appended claims.

The invention claimed is:

1. In a typewriter, a frame, a carriage movably mounted on said frame, a cylinder body mounted on said frame, a piston slidably monted in said cylinder body and adapted to be actuated by movement of said carriage, a first exhaust valve operatively mounted in said cylinder body, and an axially disposed valve control rod mounted on said piston and extending through and normally closing an aperture formed in said cylinder body, a portion of the length of said rod being formed with a longitudinal groove any part of which when disposed in said aperture will pneumatically open said aperture, said groove being longitudinally positioned in said rod so as to become operative only after the completion of a predetermined length of the stroke of said piston.

2. A dash pot comprising a cylinder body, a piston slidably mounted in a cylindrical recess formed in said body, means for moving said piston, an axially extending valve control rod secured to said piston and extending through an aperture formed in the end wall of said cylinder body, said rod being formed with a longitudinal groove which is cooperable with said aperture to define an exhaust valve, said groove being longitudinally positioned in said rod so as to become operative only after the completion of a predetermined length of the stroke of said piston, and an adjustable needle valve operatively mounted in said cylinder body.

References Cited in the file of this patent

UNITED STATES PATENTS

| 1,676,423 | Braun | July 10, 1928 |
| 2,283,565 | Michelsen | May 19, 1942 |